(12) United States Patent
Liu et al.

(10) Patent No.: US 8,788,767 B2
(45) Date of Patent: Jul. 22, 2014

(54) REGISTER SYSTEM AND METHOD FOR UTILIZING A REGISTER UNIT

(75) Inventors: Chang-Ming Liu, Hsinchu (TW); Chen-Ya Sun, Hsinchu (TW); Ko-Yun Weng, Hsinchu (TW)

(73) Assignee: Global Unichip Corp., Hsinchu Science Park, Hsinchu (TW)

( * ) Notice: Subject to any disclaimer, the term of this patent is extended or adjusted under 35 U.S.C. 154(b) by 212 days.

(21) Appl. No.: 13/179,553

(22) Filed: Jul. 10, 2011

(65) Prior Publication Data

US 2012/0219015 A1    Aug. 30, 2012

(30) Foreign Application Priority Data

Feb. 24, 2011   (TW) .............................. 100106251 A

(51) Int. Cl.
| | |
|---|---|
| G06F 12/00 | (2006.01) |
| G06F 13/00 | (2006.01) |
| G06F 12/02 | (2006.01) |
| G06F 9/30 | (2006.01) |
| G06F 13/38 | (2006.01) |
| G06F 9/50 | (2006.01) |
| H04L 12/00 | (2006.01) |

(52) U.S. Cl.
CPC ........ *G06F 9/30105* (2013.01); *G06F 12/0207* (2013.01); *G06F 9/5016* (2013.01); *G06F 13/385* (2013.01); *H04L 12/00* (2013.01)
USPC .......................................... 711/156; 711/147

(58) Field of Classification Search
USPC .............................. 370/474, 476, 464; 341/95
See application file for complete search history.

(56) References Cited

U.S. PATENT DOCUMENTS

| | | | |
|---|---|---|---|
| 2002/0141450 A1* | 10/2002 | Duvvuru ........................ | 370/476 |
| 2007/0089038 A1* | 4/2007 | Xu et al. ........................ | 714/776 |
| 2008/0100481 A1* | 5/2008 | Horie et al. .................... | 341/95 |

* cited by examiner

*Primary Examiner* — Hoon J Chung
*Assistant Examiner* — Yaotang Wang
(74) *Attorney, Agent, or Firm* — Winston Hsu; Scott Margo

(57) ABSTRACT

A register system includes a register unit and a control unit. The register unit is utilized for storing a first data packet, wherein the register unit has an end flag. The control unit is coupled to the register unit, for indicating a designated information and an end position of the first data packet by using the end flag.

18 Claims, 7 Drawing Sheets

REGISTER SYSTEM AND METHOD FOR UTILIZING A REGISTER UNIT

BACKGROUND OF THE INVENTION

1. Field of the Invention

The present disclosure relates to a register, and more particularly, to a register for using an end flag for indicating a last valid byte position of the last word of a data packet and an end position of the data packet and a related method for utilizing the register.

2. Description of the Prior Art

In computer architectures, a register is one kind of high speed computer memory, which can accelerate executions of computer programs by providing quick access to values. Generally speaking, the register is usually estimated according to the number of bits to be saved, such as a register with 32 bits or a register with 64 bits.

Please refer to FIG. 1. FIG. 1 is a diagram illustrating a conventional register 100 for storing data packets according to the prior art. As shown in FIG. 1, the register 100 is implemented by a first in first out (FIFO) register. The register 100 includes a storage unit 110, an end flag 120, and a byte enable flag 130. The register 100 is a 32-bit register. As a result, each word in the storage unit 110 is used for storing a data of 32 bits. That is to say, each column in the storage unit 110 represents a word byte, and each word byte contains four bytes (e.g., Byte 0~Byte 3). Furthermore, the storage unit 110 is used for storing at least one data packet, such as a first data packet, a second data packet . . . , and so on. The end flag 120 is used for indicating an end position of the first data packet at a position corresponding to the last column (e.g., the last word LW) of the data packet, and the byte enable flag 130 is used for indicating a last valid byte position of the last word LW of the first data packet at the position corresponding to the last column (e.g., the last word LW) of the data packet. For example, if a last valid byte of the last word LW of the first data packet includes Byte 0, the byte enable flag 130 uses two bits to be indicative of the value "00" at the position corresponding to the last column (e.g., the last word LW) of the first data packet. Under this condition, it represents that the last valid byte position of the last word LW of the first data packet is Byte 0. If the last valid bytes of the last word LW of the second data packet include Byte 0, Byte 1, and Byte 2, the byte enable flag 130 uses two bits to be indicative of the value "10" at the position corresponding to the last column (e.g., the last word LW) of the second data packet. Under this condition, it represents that the last valid byte position of the last word LW of the second data packet is Byte 2. The rest may be deduced by analogy.

Hence, how to reduce the amount of end flags of the register in order to lower the cost of the register has become an important issue to be solved by designers in this field.

SUMMARY OF THE INVENTION

It is therefore one of the objectives of the present disclosure to provide a register system for using an end flag for indicating a last valid byte position of a last word of a data packet and an end position of the data packet and a related method for utilizing the register unit to solve the above-mentioned problems.

According to one aspect of the present disclosure, an exemplary register system is provided. The exemplary register system may include a register unit and a control unit. The register unit is utilized for storing a first data packet, wherein the register unit has an end flag. The control unit is coupled to the register unit, for indicating a designated information and an end position of the first data packet by using the end flag.

According to one aspect of the present disclosure, an exemplary method for utilizing a register unit is provided. The register unit has an end flag. The method includes the following steps: using the register unit for storing the first data packet; and indicating a designated information and an end position of the first data packet by using the end flag.

Compared to the prior art, the register disclosed in the present disclosure not only can be used for saving the amount of the end flags to lower the cost of the register, but also can use the end flag for indicating the type of the data packet.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
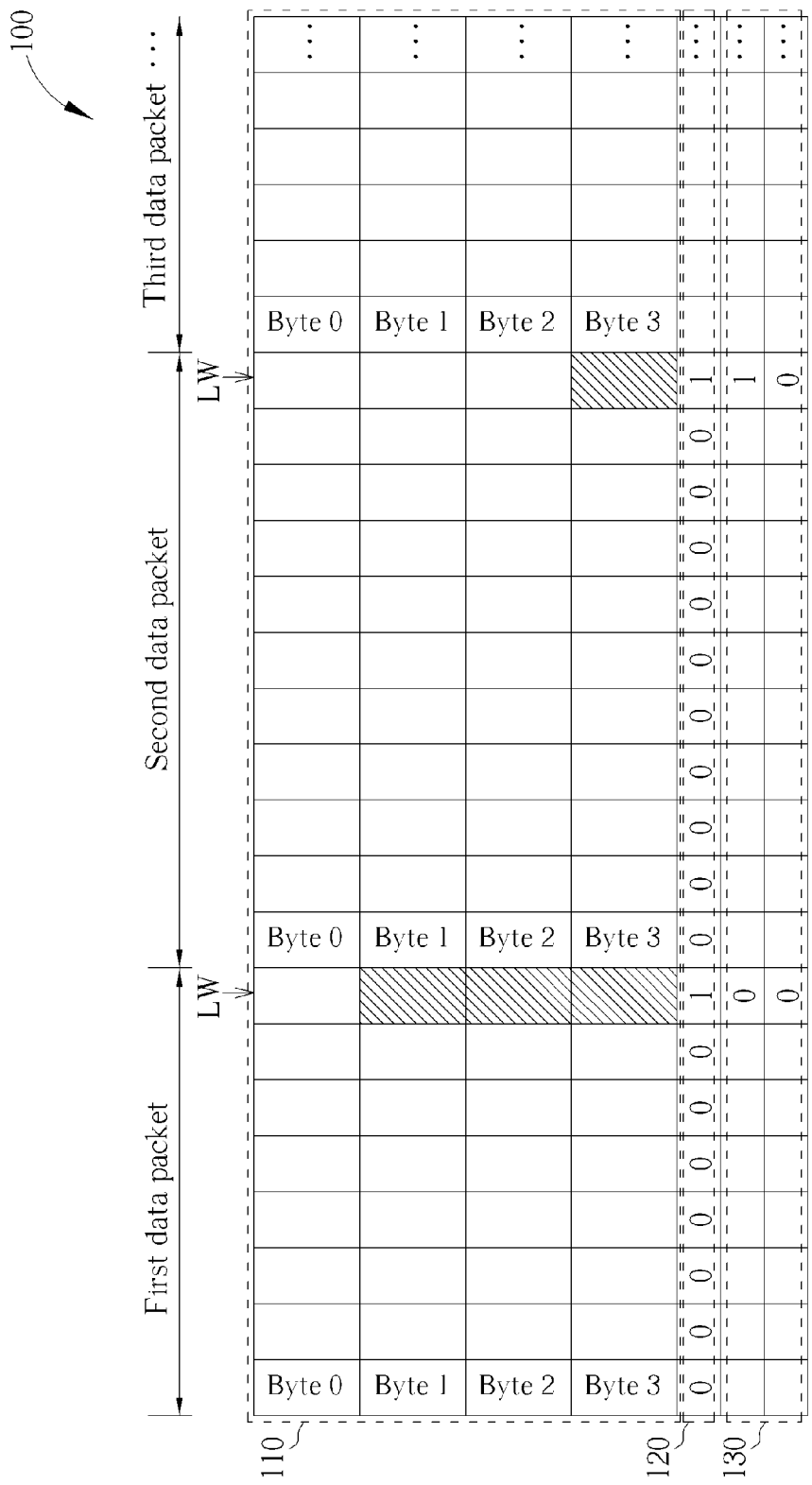
FIG. 1 is a diagram illustrating a conventional register for storing data packets according to the prior art.
Figure 2:
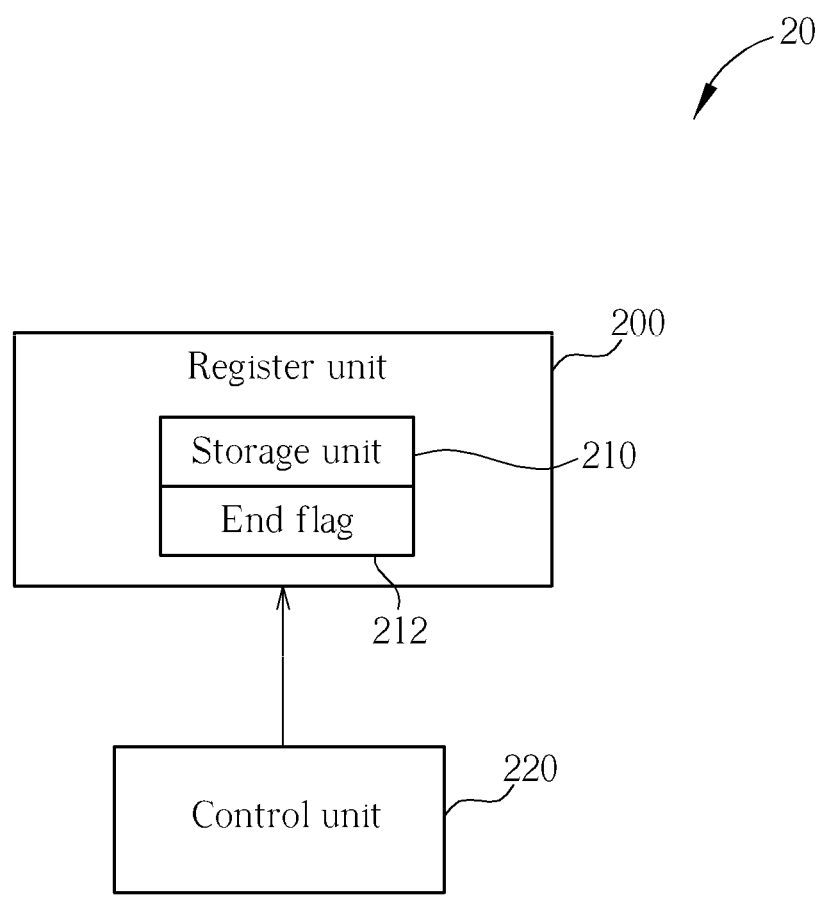
FIG. 2 is a block diagram showing a register system according to a first embodiment of the present disclosure.
Figure 3:
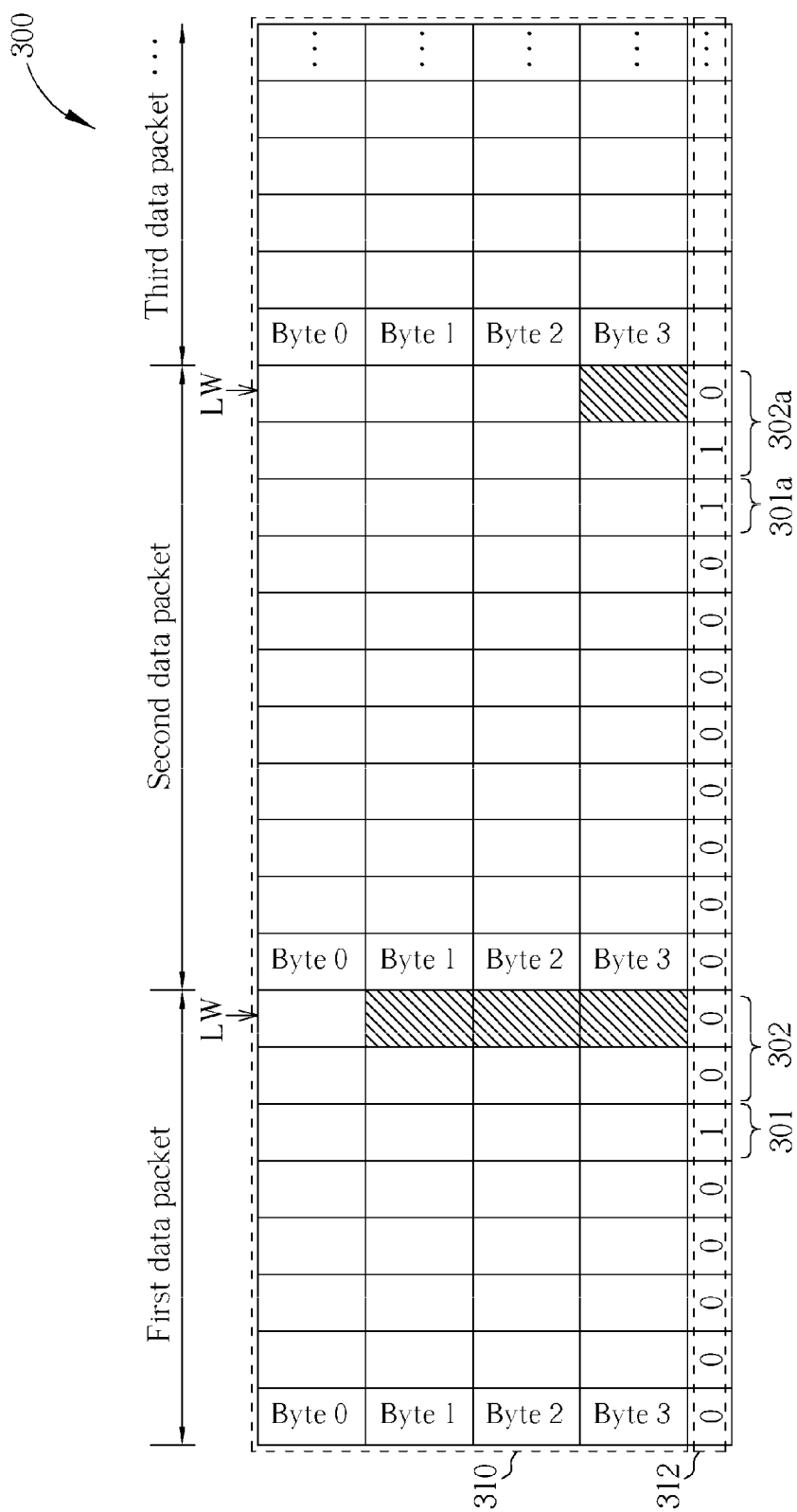
FIG. 3 is a diagram illustrating the register unit shown in FIG. 2 for storing data packets according to an embodiment of the present disclosure.

Please refer to FIG. 2 together with FIG. 3. FIG. 2 is a block diagram showing a register system 20 according to a first embodiment of the present disclosure, and FIG. 3 is a diagram illustrating the register unit shown in FIG. 2 for storing data packets according to an embodiment of the present disclosure. As shown in FIG. 2 and FIG. 3, the register system 20 may include a register unit 200 and a control unit 220. The register unit 200 further includes a storage unit 210 and an end flag 212, wherein the storage unit 210 is arranged for storing a first data packet. The control unit 220 is coupled to the register unit 200, and is arranged for indicating a designated information and an end position of LW of the first data packet by utilizing the end flag 212. What calls for special attention is that: the designated information may include a last valid byte position of the last word LW of the first data packet. Furthermore, in this embodiment, the storage unit 310 shown in FIG. 3 is arranged for storing the first data packet; the leading 1 bit 301 of the end flag 312 shown in FIG. 3 which corresponding to the first data packet is utilized for indicating the end position of the first data packet (i.e., the position of the last word LW); and a plurality of bits (such as, two bits 302) of the end flag 312, different from the leading 1 bit 301 of the end flag 312, which corresponding to the first data packet is utilized for indicating the last valid byte position of the last word of the first data packet. That is to say, in this embodiment, the end flag 312 can not only use the leading 1 bit 301 to indicate the end position of the first data packet, but also can use the two bits 302 to indicate the last valid byte position of the last word LW of the first data packet, wherein the two bits 302 are different from the bit 301.

As shown in FIG. 3, the register unit 300 may be implemented by a 32-bit register. Therefore, the two bits 302 of the end flag 312, different from the leading 1 bit 301 of the end flag 312, which corresponding to the first data packet can be utilized for indicating the last valid byte position of the last word of the first data packet, and the leading 1 bit 301 of the end flag 312 which corresponding to the first data packet can be utilized for indicating the end position of the first data packet. For example, if the leading 1 bit 301 in the end flag 312 represents that the end position of the first data packet is occurred at a position two word bytes after the position of the bit 301. In other words, the last word LW of the first data packet will be occurred at the position two columns after the position of the bit 301, but this in no way should be considered as limitations of the present disclosure. Besides, if the last valid byte of the last word LW of the first data packet is Byte 0, the last two columns (e.g., the two bits 302) in the end flag 312 will have a value of "00", which represents that the last valid byte position of the last word LW of the first data packet is Byte 0. If the last valid bytes of the last word LW of the first data packet include Byte 0 and Byte 1, the last two columns (e.g., the two bits 302) in the end flag 312 which corresponding to the first data packet will have a value of "01", which represents that the last valid byte position of the last word LW of the first data packet is Byte 1. If the last valid bytes of the last word LW of the first data packet include Byte 0, Byte 1, and Byte 2, the last two columns (e.g., the two bits 302) in the end flag 312 which corresponding to the first data packet will have a value of "10", which represents that the last valid byte position of the last word LW of the first data packet is Byte 2. If the last valid bytes of the last word LW of the first data packet include Byte 0, Byte 1, Byte 2, and Byte 3, the last two columns (e.g., the two bits 302) in the end flag 312 which corresponding to the first data packet will have a value of "11", which represents that the last valid byte position of the last word LW of the first data packet is Byte 3. Please note that, in this embodiment, the leading 1 bit 301 is an immediate neighbor in front of the two bits 302, but this should not be considered as a limitation of the present disclosure.

Figure 4:
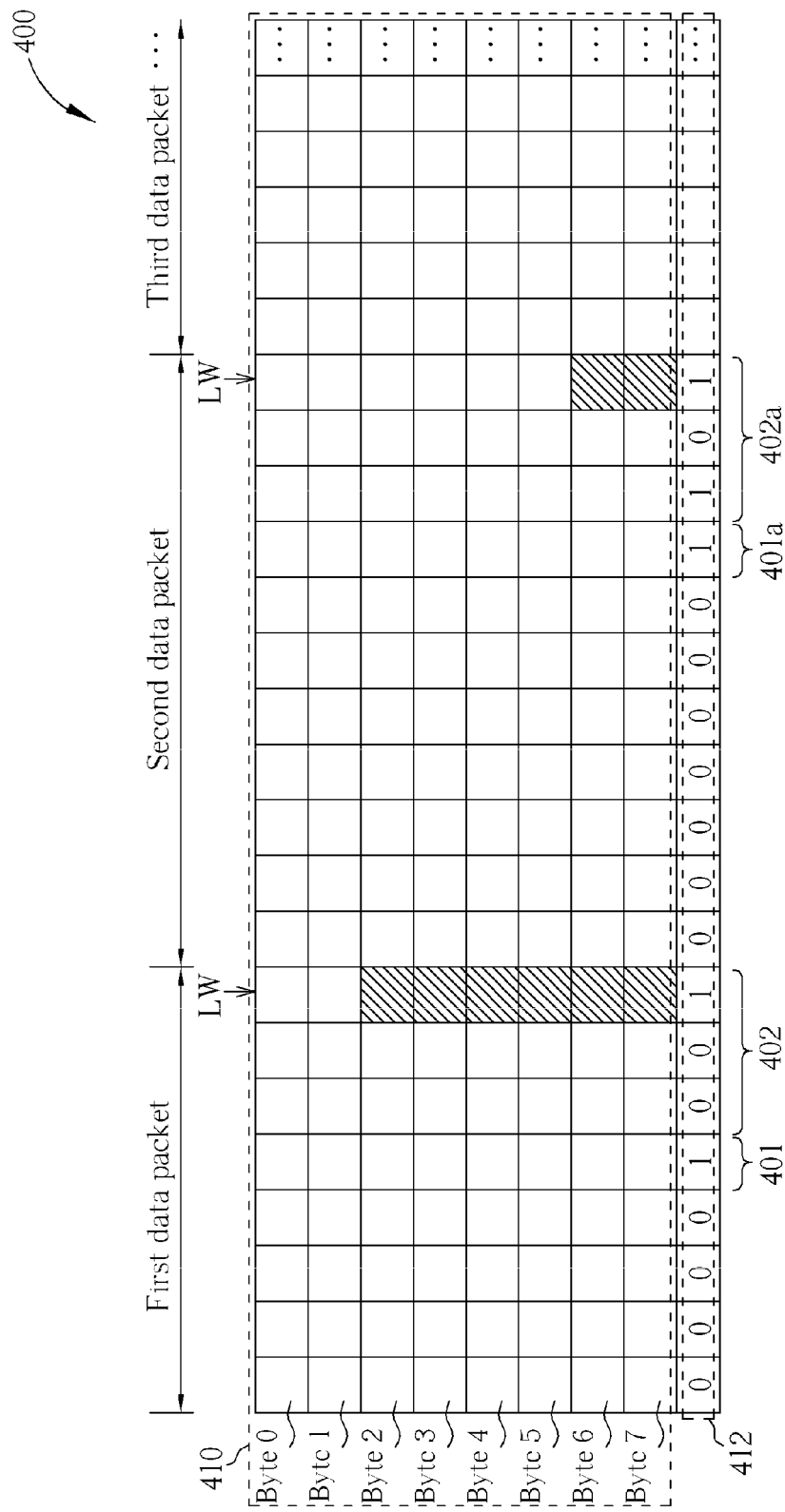
FIG. 4 is a diagram illustrating the register unit shown in FIG. 2 for storing data packets according to another embodiment of the present disclosure.

Please refer to FIG. 4. FIG. 4 is a diagram illustrating the register unit shown in FIG. 2 for storing data packets according to another embodiment of the present disclosure. The architecture of the register unit 400 show in FIG. 4 is similar to that of the register unit 300 shown in FIG. 3, and the difference between them is that the register unit 300 shown in FIG. 3 is implemented by a 32-bit register but the register unit 400 shown in FIG. 4 is implemented by a 64-bit register. In this embodiment, the register unit 400 may include a storage unit 410 and an end flag 412, wherein the storage unit 410 is arranged for storing the first data packet. As a result, each word in the storage unit 410 of the register unit 400 contains eight bytes (e.g., Byte 0~Byte 7). Hence, three bits 402 of an end flag 412, different from a leading 1 bit 401 of the end flag 412, which corresponding to the first data packet must be utilized for indicating the last valid byte position of the first data packet. For example, if the leading 1 bit 401 in the end flag 412 represents that the end position of the first data packet is occurred at a position three word bytes after the position of the bit 401. Moreover, those skilled in the art can readily understand the operations of the register unit 400 shown in FIG. 4 for using the three bits 402 to indicate the last valid byte position of the last word LW of the first data packet after reading above paragraphs directed to the operations of the register unit 300 for using the two bits 302 to indicate the last valid byte position of the last word LW of the first data packet shown in FIG. 3, and further description is omitted here for brevity.

Figure 5:
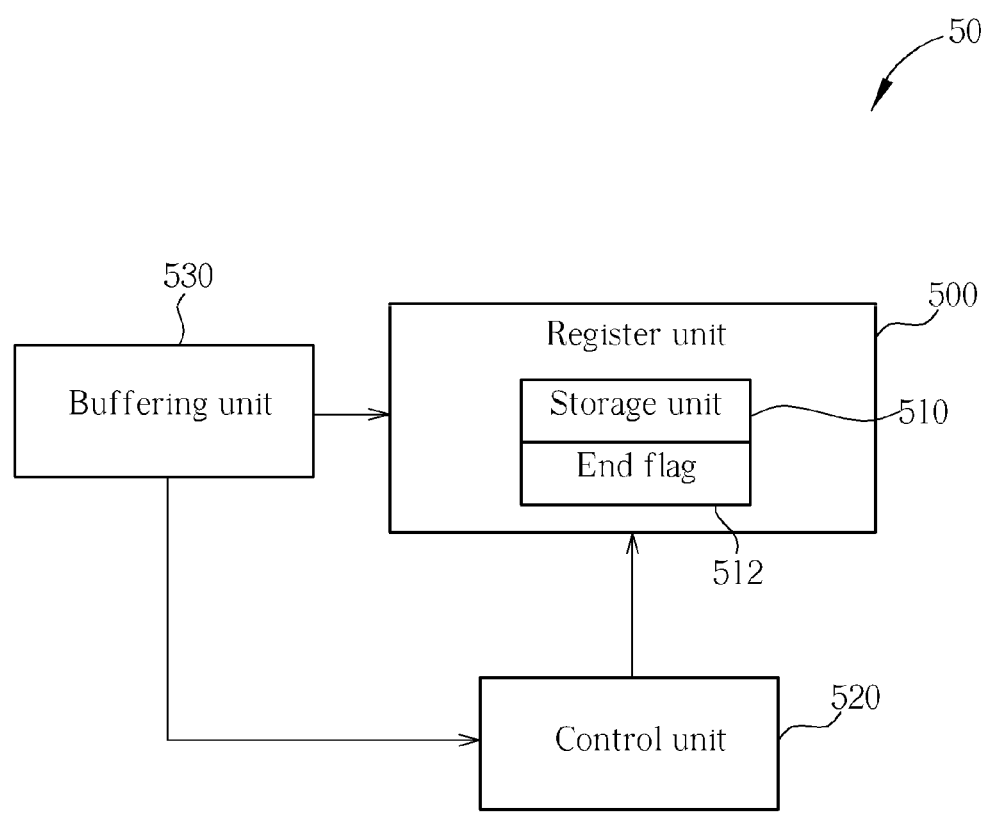
FIG. 5 is a block diagram showing a register system according to a second embodiment of the present disclosure.
Figure 6:
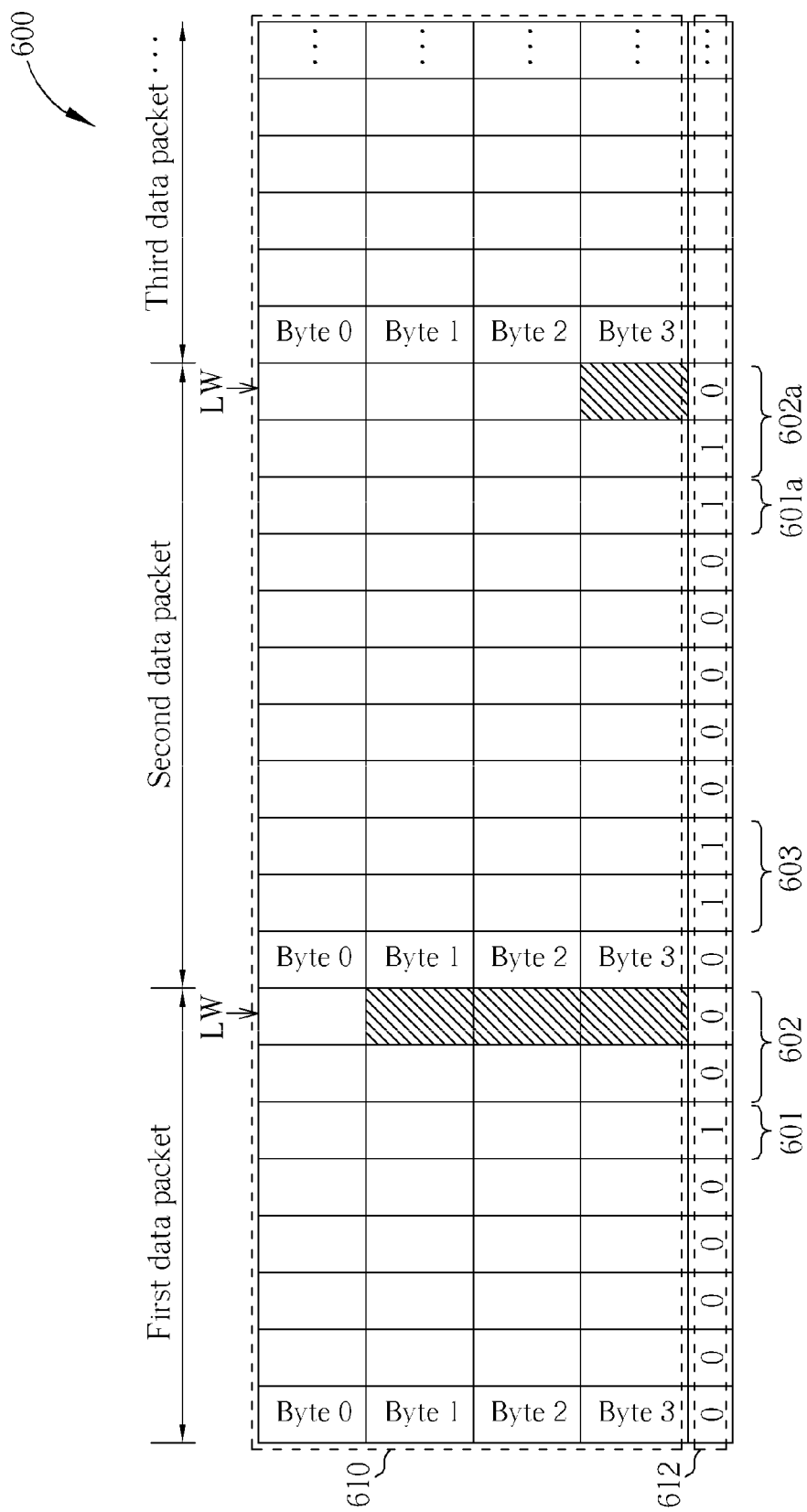
FIG. 6 is a diagram illustrating the register unit shown in FIG. 5 for storing data packets according to an embodiment of the present disclosure.

Please refer to FIG. 5. FIG. 5 is a block diagram showing a register system 50 according to a second embodiment of the present disclosure. The architecture of the register system 50 shown in FIG. 5 is similar to that of the register system 20 shown in FIG. 2, and the difference between them is that: the register system 50 further includes a buffering unit 530 for buffering the second data packet in order to capture the designated information from the second data packet, wherein the register unit 500 is further arranged for storing the second data packet, and the designated information may include a type of the second data packet. In this embodiment, the register system 50 includes the register unit 500, the control unit 520, and the buffering unit 530, wherein the register unit 500 further includes the storage unit 510 and the end flag 512. That is to say, by utilizing the buffering unit 530 disclosed in the present disclosure, the type of the second data packet can be obtained from the header of the second data packet, and the end position of the first data packet and the last valid byte position of the last word LW of the first data packet can be obtained. As a result, the control unit 520 can utilize at least one bit of the end flag 512 which corresponding to the second data packet for indicating the type of the second data packet, as is shown in FIG. 6. FIG. 6 is a diagram illustrating the register unit shown in FIG. 5 for storing data packets according to an embodiment of the present disclosure. The architecture of the register unit 600 shown in FIG. 6 is similar to that of the register unit 300 shown in FIG. 3, and the difference between them is that: the at least one bit 603 of the end flag 612 of the register unit 600 shown in FIG. 6 which corresponding to the second data packet is utilized for indicating the type of the second data packet. In this embodiment, the register unit 600 may include a storage unit 610 and an end flag 612, wherein the storage unit 610 is arranged for storing the first data packet. For example, if the type of the second data packet is Type 11, the end flag 612 uses the at least one bit 603 to be indicative of the value "11".

Furthermore, in another embodiment of the present disclosure, the buffering unit 530 can also be utilized for buffering the first data packet in order to capture the designate information from the first data packet. That is to say, the buffering unit 530 can be utilized for buffering the first data packet in order to capture, from the first data packet, the end position of the first data packet and the last valid byte position of the last word LW of the first data packet. In addition, in still another embodiment of the present disclosure, the buffering unit 530 can be utilized for buffering both the first data packet and the second data packet in order to capture the designate information from the first data packet and the second data packet. That is to say, as shown in FIG. 6, the leading 1 bit 601 of the end flag 612 which corresponding to the first data packet is utilized for indicating the end position; a plurality of bits 602 of the end flag 612, different from the bit 601 of the end flag 612, which corresponding to the first data packet is utilized for indicating the last valid byte position of the first data packet; and the at least one bit 603 of the end flag 612 which corresponding to the second data packet is utilized for indicating the type of the second data packet.

Please note that: the meaning of the abovementioned end flag 312 or 412 is equivalent to that of the end flag 212, while the meaning of the end flag 612 is equivalent to that of the end flag 512. Moreover, operations of a leading 1 bit 301a/401a/601a of the end flag 312/412/612 which corresponding to the second data packet are respectively similar to operations of the leading 1 bit 301/401/601 of the end flag 312/412/312 which corresponding to the first data packet, and further description is omitted here for brevity.

The abovementioned embodiments are presented merely to illustrate practicable designs of the present disclosure, and in no way should be considered to be limitations of the scope of the present disclosure. Obviously, those skilled in the art should appreciate that various modifications of the register unit may be made without departing from the spirit of the present disclosure. For example, the features of the register unit 500 can be combined with the features of the 64-bit register unit shown in FIG. 4 into a new varied embodiment.

From the above descriptions, the designated information of the present disclosure may include the last valid byte position of the last word of the first data packet or the type of the second data packet. Or the designated information may include both the last valid byte position of the last word of the first data packet and the type of the second data packet. Furthermore, the register unit is not limited to a 32-bit register or a 64-bit register unit. That is, a register and the related method, capable of utilizing the end flag of the register for indicating the end position of the first data packet and other designated information, should also belong to the scope of the present disclosure.

Figure 7:
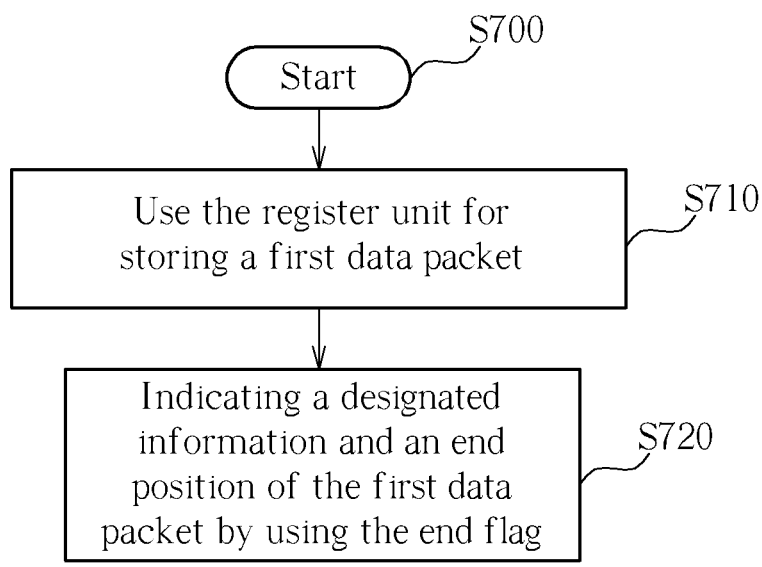
FIG. 7 is a flowchart illustrating a method for utilizing a register unit according to an exemplary embodiment of the present disclosure.

Please refer to FIG. 7. FIG. 7 is a flowchart illustrating a method for utilizing a register unit according to an exemplary embodiment of the present disclosure. The method for utilizing a register unit disclosed in the present disclosure can be applied to the register unit mentioned in the embodiments above. Please note that the following steps are not limited to be performed according to the exact sequence shown in FIG. 7 if a roughly identical result can be obtained. The method may include, but is not limited to, the following steps:

Step S700: Start.

Step S710: Use the register unit for storing a first data packet.

Step S720: Indicating a designated information and an end position of the first data packet by using the end flag.

Those skilled in the art can readily understand how each element operates by combining the steps shown in FIG. 7 and the above-mentioned paragraphs related to the register unit, and further description is omitted here for brevity.

Please note that, the steps of the abovementioned flowcharts are merely practicable embodiments of the present invention, and in no way should be considered to be limitations of the scope of the present invention. The method can include other intermediate steps or several steps can be merged into a single step without departing from the spirit of the present invention.

The abovementioned embodiments are presented merely to illustrate practicable designs of the present invention, and should be considered to be limitations of the scope of the present invention. In summary, a register for using an end flag for indicating the last valid byte position of the last word of a data packet, an end position of the data packet, and a type of the data packet and a related method for utilizing the register are provided in the present disclosure. Therefore, not only can the amount of the end flags be saved in order to lower the cost of the register, but also can the end flag be used for indicating the type of the data packet.

Those skilled in the art will readily observe that numerous modifications and alterations of the device and method may be made while retaining the teachings of the invention.

What is claimed is:

1. A register system, comprising:
   a register unit, comprising a plurality of columns and rows for storing bytes of packets, wherein each column of the register unit stores a word byte and each row of the register unit is associated with a unique byte position such that each row of the register unit has a different byte position from the other rows;
   wherein the register unit is further arranged for storing a first data packet and an end flag, wherein the first data packet comprises a plurality of data blocks to be stored in the columns of the register unit, each data block comprises a plurality of bytes and the end flag comprises a plurality of bits associated with the first data packet;
   wherein the end flag further comprises a number of the plurality of bits that is equal to a number of the plurality of columns of the register unit to store data blocks of the first data packet such that each bit in the plurality of bits is to be stored at a position associated with each column that is used to store the data blocks of the first data packet;
   wherein the end flag further comprises an end column bit from the plurality of bits, wherein the end column bit is to be stored at a different position than the position that is associated with the end column of the register unit storing the last data block of the first data packet;
   wherein the end flag further comprises a plurality of row bits from the plurality of bits following the end column bit indicating at where a last valid byte of a last word (LW) of the first data packet is to be stored in the register unit; and
   a control unit, coupled to the register unit, arranged for indicating a designated information and an end position of the first data packet in the register unit by using the end flag.

2. The register system according to claim 1, wherein the designated information comprises a last valid byte position of the last word of the first data packet.

3. The register system according to claim 2, further comprising:
   a buffering unit, arranged for buffering the first data packet in order to capture the designated information from the first data packet.

4. The register system according to claim 1, wherein the register unit is further arranged for storing a second data packet, and the designated information comprises a type of the second data packet.

5. The register system according to claim 4, wherein at least one bit of the end flag which corresponding to the second data packet is utilized for indicating the type of the second data packet.

6. The register system according to claim 4, further comprising:
   a buffering unit, arranged for buffering the second data packet in order to capture the designated information from the second data packet.

7. The register system according to claim 1, wherein the register unit is further arranged for storing a second data packet, and the designated information comprises a last valid byte position of the last word of the first data packet and a type of the second data packet.

8. The register system according to claim 7, wherein a leading 1 bit of the end flag which corresponding to the first data packet is utilized for indicating the end position of the first data packet; a plurality of bits of the end flag, different from the leading 1 bit of the end flag, which corresponding to the first data packet is utilized for indicating the last valid byte position of the last word of the first data packet; and at least one bit of the end flag which corresponding to the second data packet is utilized for indicating the type of the second data packet.

9. The register system according to claim 7, further comprising:
a buffering unit, arranged for buffering the first data packet and the second data packet in order to capture the designated information from the first data packet and the second data packet.

10. A method for utilizing a register unit, the register unit comprising a plurality of columns and rows for storing bytes of packets, wherein each column of the register unit stores a word byte and each row of the register unit is associated with a unique byte position such that each row of the register unit has a different byte position from the other rows, the method comprising:
using the register unit for storing a first data packet and an end flag, wherein the first data packet comprises a plurality of data blocks to be stored in the columns of the register unit, each data block comprises a plurality of bytes and the end flag comprises a plurality of bits associated with the first data packet;
wherein the end flag further comprises a number of the plurality of bits that is equal to a number of the plurality of columns of the register unit to store data blocks of the first data packet such that each bit in the plurality of bits is to be stored at a position associated with each column that is used to store the data blocks of the first data packet;
wherein the end flag further comprises an end column bit from the plurality of bits, wherein the end column bit is to be stored at a different position than the position that is associated with the end column of the register unit storing the last data block of the first data packet;
wherein the end flag further comprises a plurality of row bits from the plurality of bits following the end column bit indicating at where a last valid byte of a last word (LW) of the first data packet is to be stored in the register unit; and
indicating a designated information and an end position of the first data packet in the register unit by using the end flag.

11. The method according to claim 10, wherein the designated information comprises a last valid byte position of the last word of the first data packet.

12. The method according to claim 10, further comprising:
buffering the first data packet in order to capture the designated information from the first data packet.

13. The method according to claim 10, further comprising:
using the register unit for storing a second data packet, wherein the designated information comprises a type of the second data packet.

14. The method according to claim 13, wherein at least one bit of the end flag which corresponding to the second data packet is utilized for indicating the type of the second data packet.

15. The method according to claim 13, further comprising:
buffering the second data packet in order to capture the designated information from the second data packet.

16. The method according to claim 10, further comprising:
using the register unit for storing a second data packet, wherein the designated information comprises a last valid byte position of the last word of the first data packet and a type of the second data packet.

17. The method according to claim 16, wherein a leading 1 bit of the end flag which corresponding to the first data packet is utilized for indicating the end position of the first data packet; a plurality of bits of the end flag, different from the leading 1 bit of the end flag, which corresponding to the first data packet is utilized for indicating the last valid byte position of the last word of the first data packet; and at least one bit of the end flag which corresponding to the second data packet is utilized for indicating the type of the second data packet.

18. The method according to claim 16, further comprising:
buffering the first data packet and the second data packet in order to capture the designated information from the first data packet and the second data packet.

* * * * *